US011996616B2

(12) United States Patent
Zhao et al.

(10) Patent No.: US 11,996,616 B2
(45) Date of Patent: May 28, 2024

(54) ANTENNA AND COMMUNICATIONS DEVICE

(71) Applicant: HUAWEI TECHNOLOGIES CO., LTD., Guangdong (CN)

(72) Inventors: Jie Zhao, Nanjing (CN); Xiao Zhou, Shanghai (CN); Zui Tao, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/324,757

(22) Filed: May 19, 2021

(65) Prior Publication Data

US 2021/0367350 A1 Nov. 25, 2021

(30) Foreign Application Priority Data

May 20, 2020 (CN) ......................... 202010431978.9

(51) Int. Cl.

*H01Q 9/30* (2006.01)
*H01Q 15/24* (2006.01)
*H01Q 21/00* (2006.01)

(52) U.S. Cl.

CPC ............. *H01Q 15/246* (2013.01); *H01Q 9/30* (2013.01); *H01Q 21/0075* (2013.01)

(58) Field of Classification Search

CPC .... H01Q 15/246; H01Q 9/30; H01Q 21/0075; H01Q 1/38; H01Q 9/065; H01Q 19/108; H01Q 21/062; H01Q 21/24; H01Q 1/246; H01Q 1/50; H01Q 1/521; H01Q 3/32; H01Q 21/0006; H01Q 21/205; H01Q 15/14; H01Q 19/30; H01Q 21/26; H01Q 25/04;

(Continued)

(56) References Cited

U.S. PATENT DOCUMENTS

2014/0022131 A1 1/2014 Azulay et al.
2017/0033471 A1* 2/2017 Huang ................ H01Q 21/205

(Continued)

FOREIGN PATENT DOCUMENTS

CN 102709673 A 10/2012
CN 104051843 A 9/2014
CN 106410397 A 2/2017

(Continued)

OTHER PUBLICATIONS

Yu Yufeng et al: "Compact omni-directional circularly polarised antenna utilising bended dipoles and integrated baluns",IET Microwaves, Antennas and Propagation, the Institution of Engineering and Technology, United Kingdom,vol. 11, No. 10, Aug. 2017,Total 6 Pages.

(Continued)

*Primary Examiner* — Graham P Smith

(57) ABSTRACT

An antenna for wireless communications includes a horizontal polarization antenna and a vertical polarization antenna that are disposed in a stacked manner. The horizontal polarization antenna includes a radiation element and a double-sided parallel strip line. One end of the double-sided parallel strip line is connected to the radiation element. A length range of the double-sided parallel strip line is 0.58 to 1.35 times a waveguide wavelength of an electromagnetic wave in the double-sided parallel strip line at an operating frequency of the vertical polarization antenna.

14 Claims, 8 Drawing Sheets

(58) Field of Classification Search
CPC .......... H01Q 3/24; H01Q 5/321; H01Q 3/247; H01Q 9/26; H01Q 9/285
See application file for complete search history.

(56) References Cited

U.S. PATENT DOCUMENTS

| | | | |
|---|---|---|---|
| 2017/0237174 | A1 | 8/2017 | Nysen et al. |
| 2019/0245278 | A1 | 8/2019 | Hsieh et al. |

FOREIGN PATENT DOCUMENTS

| | | | | |
|---|---|---|---|---|
| JP | S59101510 | U | | 7/1984 |
| JP | H11261335 | A | | 9/1999 |
| JP | H11284425 | A | | 10/1999 |
| JP | 4347002 | B2 | | 10/2009 |
| JP | 2016517225 | A | | 6/2016 |
| WO | 2015109995 | A1 | | 7/2015 |
| WO | 2018076681 | A1 | | 5/2018 |
| WO | WO-2018076681 | A1 | * | 5/2018 |

OTHER PUBLICATIONS

Li Zheyu et al.,“Overview of Omnidirectional Circularly-polarized Antenna Technology”,Telecommunication Engineering ,vol. 59, No. 9,Sep. 2019, with an English abstract, total 8 pages.

He Huang et al.,“Broadband Dual-Polarized Omnidirectional Antenna for 2G/3G/LTE/WiFi Applications”,IEEE Antennas and Wireless Propagation Letters, vol. 15, 2016,total 4 pages.

* cited by examiner

ANTENNA AND COMMUNICATIONS DEVICE

CROSS-REFERENCE TO RELATED APPLICATION

This application claims priority to Chinese Patent Application No. 202010431978.9, filed on May 20, 2020, which is hereby incorporated by reference in its entirety.

TECHNICAL FIELD

This application relates to the field of wireless communications technologies, and in particular, to an antenna and a communications device.

BACKGROUND

In a wireless local area network (wireless local area network, WLAN) service, more antennas may be integrated into an access point (access point, AP) to improve signal bandwidth of the AP. A vertical polarization antenna and a horizontal polarization antenna may be placed on the AP in a stacked manner, to reduce a size of the AP. An antenna is required to have strong radiation at a large angle and have a far-region coverage capability, to ensure a signal coverage distance of the AP.

Limited by an AP thickness, a spacing between the horizontal polarization antenna and the vertical polarization antenna is small, and coupling is strong. It represents that the horizontal polarization antenna above the vertical polarization antenna affects radiation of the vertical polarization antenna below. This reduces a maximum radiation angle of the vertical polarization antenna, and shortens a coverage distance of the vertical polarization antenna. That is, that the horizontal polarization antenna blocks the vertical polarization antenna deteriorates radiation performance of the vertical polarization antenna.

SUMMARY

This application provides an antenna and a communications device, to resolve a problem that radiation performance of a vertical polarization antenna deteriorates due to a blocking problem.

According to a first aspect, an antenna is provided. The antenna includes a horizontal polarization antenna and a vertical polarization antenna that are disposed in a stacked manner. The horizontal polarization antenna includes a radiation element and a double-sided parallel strip line (double-sided parallel strip line, DSPSL). One end of the double-sided parallel strip line is connected to the radiation element. A length range of the double-sided parallel strip line is 0.58 to 1.35 times a waveguide wavelength of an electromagnetic wave in the double-sided parallel strip line at an operating frequency of the vertical polarization antenna.

In this application, when the vertical polarization antenna works, radiant energy of the vertical polarization antenna is coupled to the horizontal polarization antenna, and is transmitted to the radiation element through the double-sided parallel strip line for radiation (in this application, a field in which the energy obtained by the horizontal polarization antenna from the vertical polarization antenna through coupling is radiated is referred to as a coupling radiation field of the horizontal polarization antenna). In this case, distribution of a total radiation field of the vertical polarization antenna is affected by the coupling radiation field of the horizontal polarization antenna. In this application, the total radiation field of the vertical polarization antenna refers to a radiation field as interference result of the coupling radiation field of the horizontal polarization antenna and a radiation field of the vertical polarization antenna. A total phase delay of the double-sided parallel strip line is changed by adjusting a length of the double-sided parallel strip line, to adjust a phase of the coupling radiation field of the horizontal polarization antenna. The total radiation field of the vertical polarization antenna is changed (that is, an intervention mode of the coupling radiation field of the horizontal polarization antenna and the radiation field of the vertical polarization antenna is changed), to achieve a purpose of adjusting a radiation angle of the vertical polarization antenna to enhance a large-angle radiation capability of the vertical polarization antenna. According to the solutions provided in this application, deterioration of radiation performance of the vertical polarization antenna caused by a blocking problem is alleviated without increasing an overall height of the antenna.

Optionally, the double-sided parallel strip line is not linear.

Optionally, a linear distance between the radiation element and the other end of the double-sided parallel strip line is 0.36 to 0.57 times the waveguide wavelength. For example, if an operating frequency of the vertical polarization antenna is 5.5 gigahertz (GHz), a dielectric constant of a material inside the double-sided parallel strip line is 4.6, and a thickness of the material is 1 millimeter, the linear distance between the radiation element and the other end of the double-sided parallel strip line ranges from 10.94 millimeters to 17.33 millimeters.

In this application, the double-sided parallel strip line is designed to be non-linear, so that an area of the horizontal polarization antenna in a horizontal direction can be reduced while a length requirement of the double-sided parallel strip line is met, thereby reducing a volume of the antenna.

Optionally, the double-sided parallel strip line includes a bent line structure and/or a curved line structure.

Optionally, an operating frequency band of the vertical polarization antenna is the same as an operating frequency band of the horizontal polarization antenna. In this application, the operating frequency of the vertical polarization antenna is the same as or close to an operating frequency of the horizontal polarization antenna.

Optionally, line widths of the double-sided parallel strip line are not all equal, that is, the double-sided parallel strip line is of an unequal-line-width structure.

In this application, impedance matching of the horizontal polarization antenna can be implemented by designing unequal line widths of the double-sided parallel strip line.

Optionally, the radiation element is a dipole element. For example, the radiation element is a double-sided printed dipole element.

Optionally, the vertical polarization antenna is a monopole antenna.

Optionally, the horizontal polarization antenna further includes a substrate. Both the double-sided parallel strip line and the radiation element are disposed on the substrate.

Optionally, the antenna further includes a ground plate. The vertical polarization antenna is disposed on the ground plate, and the horizontal polarization antenna is disposed on a side that is of the vertical polarization antenna and that is away from the ground plate.

According to a second aspect, a communications device is provided. The communications device includes a radio frequency circuit and the antenna according to any one of the first aspect. The radio frequency circuit is connected to the antenna.

The technical solutions provided in this application have at least the following beneficial effects.

DESCRIPTION OF EMBODIMENTS

To make the objectives, technical solutions, and advantages of this application clearer, the following further describes an antenna and a communications device provided in embodiments of this application in detail with reference to the accompanying drawings.

Figure 1:
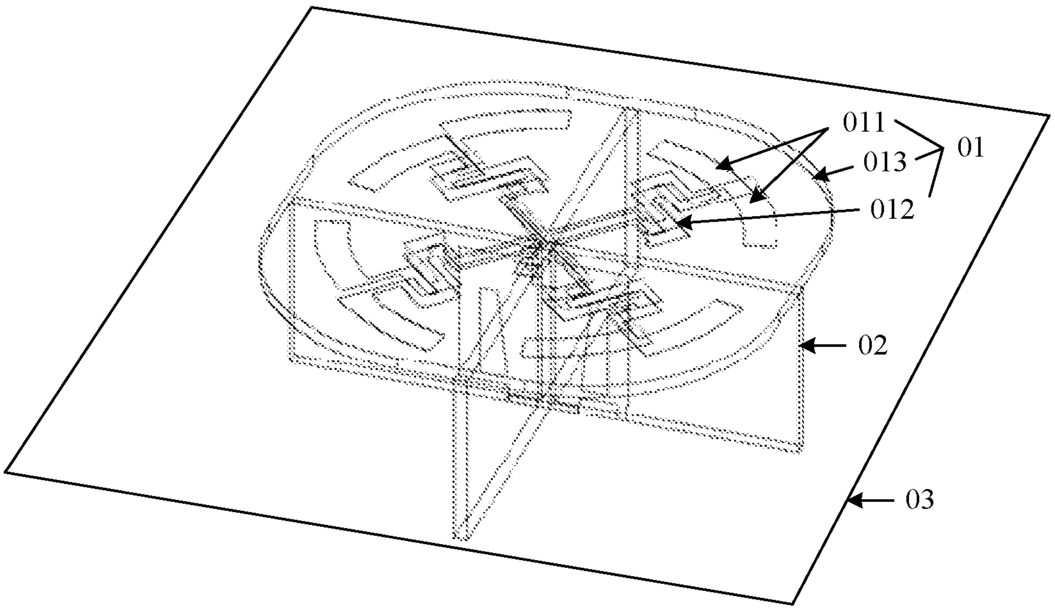
FIG. 1 is a schematic structural diagram of an antenna according to an embodiment of this application.
Figure 2:
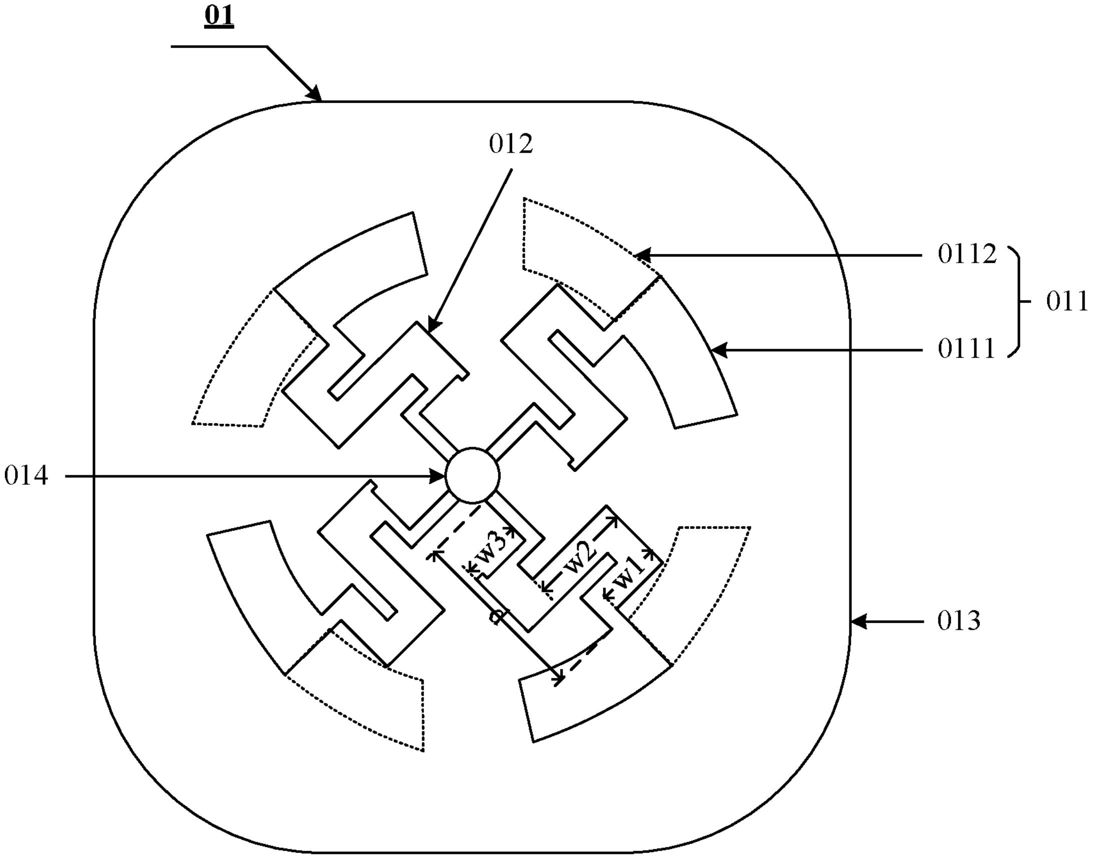
FIG. 2 is a schematic structural diagram of a horizontal polarization antenna according to an embodiment of this application.

FIG. 1 is a schematic structural diagram of an antenna according to an embodiment of this application. As shown in FIG. 1, the antenna includes a horizontal polarization antenna 01 and a vertical polarization antenna 02 that are disposed in a stacked manner. FIG. 2 is a schematic structural diagram of a horizontal polarization antenna according to an embodiment of this application. As shown in FIG. 1 and FIG. 2, the horizontal polarization antenna 01 includes a radiation element 011 and a double-sided parallel strip line 012. One end of the double-sided parallel strip line 012 is connected to the radiation element 011.

A length range of the double-sided parallel strip line 012 is 0.58 to 1.35 times a waveguide wavelength of an electromagnetic wave in the double-sided parallel strip line 012 at an operating frequency of the vertical polarization antenna 02.

The waveguide wavelength is a wavelength at which the electromagnetic wave is transmitted in the double-sided parallel strip line 012 at the operating frequency of the vertical polarization antenna 02. The waveguide wavelength is correlated with the operating frequency, a size of the double-sided parallel strip line, and a dielectric constant and a thickness of a material inside the double-sided parallel strip line. A length of the double-sided parallel strip line adjusts one waveguide wavelength, and a corresponding phase variation is 360°.

Optionally, referring to FIG. 1 and FIG. 2, the horizontal polarization antenna 01 further includes a substrate 013. The radiation element 011 and the double-sided parallel strip line 012 are both disposed on the substrate 013. The material inside the double-sided parallel strip line 012 is a material of the substrate 013. The substrate may be a printed circuit board (printed circuit board, PCB). For example, the operating frequency of the vertical polarization antenna 02 is 5.5 GHz, a dielectric constant of the substrate 013 is 4.6, and a thickness of the substrate 013 is 1 millimeter. In this case, the waveguide wavelength of the electromagnetic wave in the double-sided parallel strip line 012 is 30.4 millimeters. The length range of the double-sided parallel strip line 012 is 17.63 millimeters to 41.04 millimeters. Optionally, the substrate 013 is an epoxy resin board.

In conclusion, the embodiments of this application provide the antenna. The antenna includes the horizontal polarization antenna and the vertical polarization antenna that are disposed in the stacked manner. The length of the double-sided parallel strip line is 0.58 to 1.35 times the waveguide wavelength of the electromagnetic wave in the double-sided parallel strip line at the operating frequency of the vertical polarization antenna. When the vertical polarization antenna works, distribution of a radiation field of the vertical polarization antenna is affected by a coupling radiation field of the horizontal polarization antenna. A total phase delay of the double-sided parallel strip line of the horizontal polarization antenna is changed by adjusting the length of the double-sided parallel strip line, to adjust a phase of the coupling radiation field of the horizontal polarization antenna. The total radiation field of the vertical polarization antenna is changed, that is, an intervention mode of the coupling radiation field of the horizontal polarization antenna and the radiation field of the vertical polarization antenna is changed, to achieve a purpose of adjusting a radiation angle of the vertical polarization antenna to enhance a large-angle radiation capability of the vertical polarization antenna. According to the solutions provided in this application, deterioration of radiation performance of the vertical polarization antenna caused by a blocking problem can be alleviated without increasing an overall height of the antenna.

Figure 3:
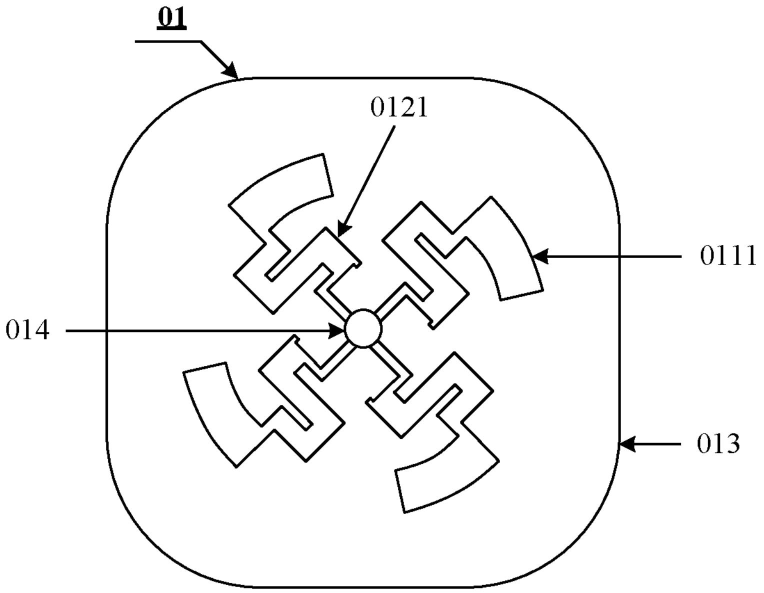
FIG. 3 is a top view of a first side of a horizontal polarization antenna according to an embodiment of this application.
Figure 4:
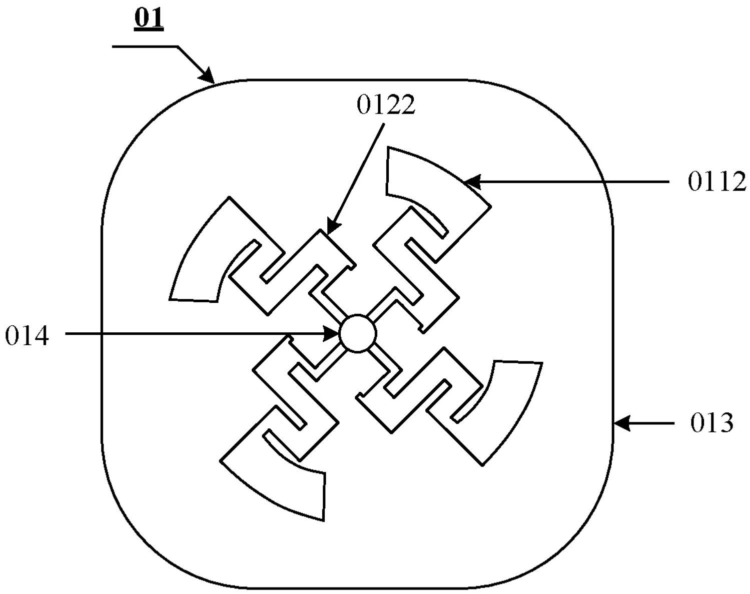
FIG. 4 is a top view of a second side of a horizontal polarization antenna according to an embodiment of this application.

The horizontal polarization antenna 01 has two opposite sides, which are respectively a first side away from the vertical polarization antenna and a second side close to the vertical polarization antenna. FIG. 3 is a top view of a first side of a horizontal polarization antenna according to an embodiment of this application. FIG. 4 is atop view of a second side of a horizontal polarization antenna according to an embodiment of this application. Referring to FIG. 2, FIG. 3, and FIG. 4, the radiation element 011 is a double-sided printed radiation element. The radiation element 011 includes a first arm 0111 located on a first side of the substrate 013 and a second arm 0112 located on a second side of the substrate 013. The double-sided parallel strip line 012 includes a first conductor 0121 located on the first side of the substrate 013 and a second conductor 0122 located on the second side of the substrate 013. The first conductor 0121 and the second conductor 0122 have a same shape and a same line width. To be specific, an orthographic projection of the first conductor 0121 on the substrate 013 fully coincides with an orthographic projection of the second conductor 0122 on the substrate 013. The first arm 0111 is connected to the first conductor 0121, and the second arm 0112 is connected to the second conductor 0122.

In the embodiment of this application, the horizontal polarization antenna includes one radiation element and one double-sided parallel strip line, or the horizontal polarization antenna includes a plurality of radiation elements and a plurality of double-sided parallel strip lines. A quantity of radiation elements is the same as a quantity of double-sided parallel strip lines. Each double-sided parallel strip line is connected to one radiation element. For example, referring to FIG. 1 to FIG. 4, the horizontal polarization antenna 01 includes four radiation elements 011 and four double-sided parallel strip lines 012.

Optionally, referring to FIG. 2 to FIG. 4, the horizontal polarization antenna 01 further includes a feedpoint 014. One end of the double-sided parallel strip line 012 is connected to the radiation element 011, and the other end is connected to the feedpoint 014. The feedpoint 014 feeds the first arm 0111 in the radiation element 011 through the first conductor 0121 in the double-sided parallel strip line 012, and feeds the second arm 0112 in the radiation element 011 through the second conductor 0122 in the double-sided parallel strip line 012.

Optionally, when the horizontal polarization antenna includes the plurality of radiation elements and the plurality of double-sided parallel strip lines, the plurality of radiation elements are disposed axisymmetrically or centrosymmetrically, and the plurality of double-sided parallel strip lines are connected to one feedpoint. For example, referring to FIG. 2 to FIG. 4, the four radiation elements 011 in the horizontal polarization antenna 01 are disposed centrosymmetrically, and the feedpoint 014 is located in a symmetric center of the four radiation elements 011. The feedpoint may also be referred to as a central feedpoint. Optionally, the feedpoint is a metal patch. The feedpoint may be in a circular shape, a rectangular shape, or the like.

In the embodiment of this application, the horizontal polarization antenna may be fed by using a coaxial cable, and the coaxial cable (not shown in the figure) is connected to the feedpoint. If the quantity of radiation elements included in the horizontal polarization antenna is N, and N is an integer greater than 1, the horizontal polarization antenna may also be referred to as an N-element antenna. Correspondingly, the horizontal polarization antenna includes N double-sided parallel strip lines, and the N double-sided parallel strip lines and the feedpoint form a feeding network, to transfer energy transmitted by the coaxial cable to the N radiation elements. Therefore, the N radiation elements can be fed. The feedpoint is connected to a one-to-N power splitter. The one-to-N power splitter can divide the energy transmitted by the coaxial cable into N paths, and respectively transmit the N paths of energy to the N double-sided parallel strip lines through the feedpoint.

Optionally, referring to FIG. 1 to FIG. 4, the double-sided parallel strip line 012 is not linear. That is, a length of the double-sided parallel strip line 012 is greater than a distance between the radiation element 011 and the feedpoint 014. Optionally, a linear distance (that is, a linear distance between the radiation element 011 and the feedpoint 014) between the radiation element 011 and the other end of the double-sided parallel strip line 012 is 0.36 to 0.57 times the waveguide wavelength. For example, if an operating frequency of the vertical polarization antenna 02 is 5.5 GHz, a dielectric constant of a material inside the double-sided parallel strip line 012 is 4.6, and a thickness of the material is 1 millimeter, the linear distance between the radiation element 011 and the other end of the double-sided parallel strip line 012 ranges from 10.94 millimeters to 17.33 millimeters.

Figure 5:
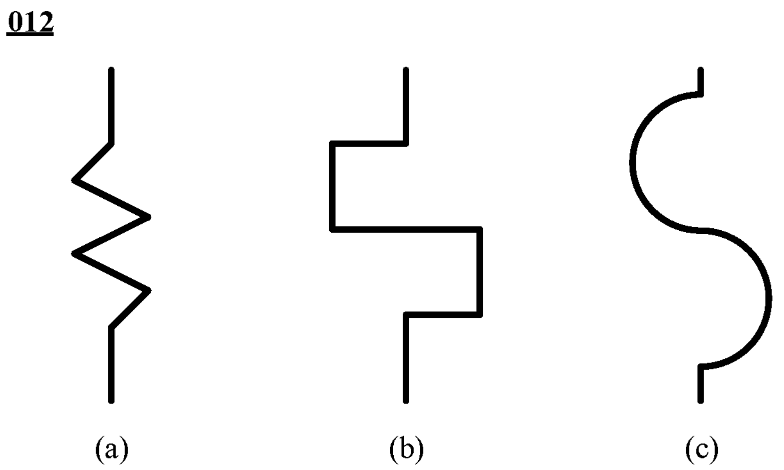
FIG. 5 is a schematic structural diagram of a double-sided parallel strip line according to an embodiment of this application.

Optionally, the double-sided parallel strip line includes a bent line structure and/or a curved line structure. For example, FIG. 5 is a schematic structural diagram of a double-sided parallel strip line according to an embodiment of this application. As shown in FIG. 5(*a*), the double-sided parallel strip line 012 is of a sawtooth-shaped bent line structure. Alternatively, as shown in FIG. 5(*b*), the double-sided parallel strip line 012 is of a square-shape bent line structure. Alternatively, as shown in FIG. 5(*c*), the double-sided parallel strip line 012 is of a curved line structure. The structures of the double-sided parallel strip line in FIG. 5 are merely used for illustration. A shape of the double-sided parallel strip line is not limited in the embodiments of this application. Referring to FIG. 1 to FIG. 4, the double-sided parallel strip line 012 is the square-shape bent line structure. For example, a length of the double-sided parallel strip line 012 is 27.72 millimeters. Referring to FIG. 2, a distance d between the radiation element 011 and the feedpoint 014 is 15.96 millimeters. A length w1 of a first curved section of the double-sided parallel strip line 012 is 2.94 millimeters, a length w2 of a second curved section is 5.88 millimeters, and a length w3 of a third curved section is 2.94 millimeters.

In this embodiment of this application, the double-sided parallel strip line is designed to be non-linear, so that an area of the horizontal polarization antenna in a horizontal direction can be reduced while a length requirement of the double-sided parallel strip line is met, thereby reducing a volume of the antenna.

Alternatively, the double-sided parallel strip line 012 may be linear. This is not limited in the embodiments of this application.

Optionally, the double-sided parallel strip line has unequal line widths, that is, the line widths of the double-sided parallel strip line are not all equal. For example, line widths of two ends of the double-sided parallel strip line are less than line widths of a middle part of the double-sided parallel strip line. Impedance matching of the horizontal polarization antenna can be implemented by designing the unequal line widths of the double-sided parallel strip line.

Optionally, the radiation element in the horizontal polarization antenna is a dipole element. Referring to FIG. 2 to FIG. 4, the first arm 0111 and the second arm 0112 included in the dipole element 011 are arranged symmetrically around an axis of the double-sided parallel strip line 012. That is, an extension direction of the first arm 0111 is opposite to an extension direction of the second arm 0112.

Alternatively, the radiation element in the horizontal polarization antenna may be another type of radiation element, for example, may be a slot radiation element. In this case, the horizontal polarization antenna is a slot antenna.

Optionally, the vertical polarization antenna is a monopole antenna. An operating frequency band of the vertical polarization antenna may be the same as an operating frequency band of the horizontal polarization antenna. For example, operating frequency bands of both the vertical polarization antenna and the horizontal polarization antenna may be 5 GHz frequency bands.

Figure 6:
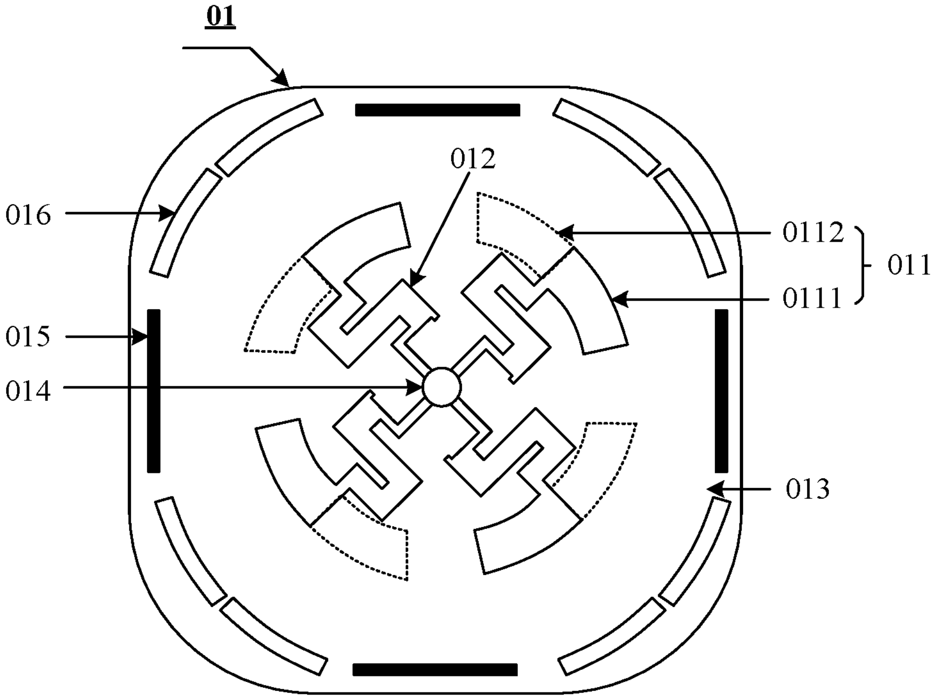
FIG. 6 is a schematic structural diagram of another horizontal polarization antenna according to an embodiment of this application.

Optionally, FIG. 6 is a schematic structural diagram of another horizontal polarization antenna according to an embodiment of this application. As shown in FIG. 6, the horizontal polarization antenna 01 further includes a plurality of directors 015 and a plurality of reflectors 016. The plurality of directors 015 and the plurality of reflectors 016 are all located on a first side of the substrate 013, and are evenly arranged around the radiation element 011. For example, FIG. 6 shows that the horizontal polarization antenna includes 4 directors 015 and 4 reflectors 016.

Optionally, referring to FIG. 1, the antenna further includes a ground plate 03. The vertical polarization antenna 02 is disposed on the ground plate 03, and the horizontal polarization antenna 01 is disposed on a side that is of the vertical polarization antenna 02 and that is away from the ground plate 03. The ground plate 03 may be a metal plate.

Figure 7:
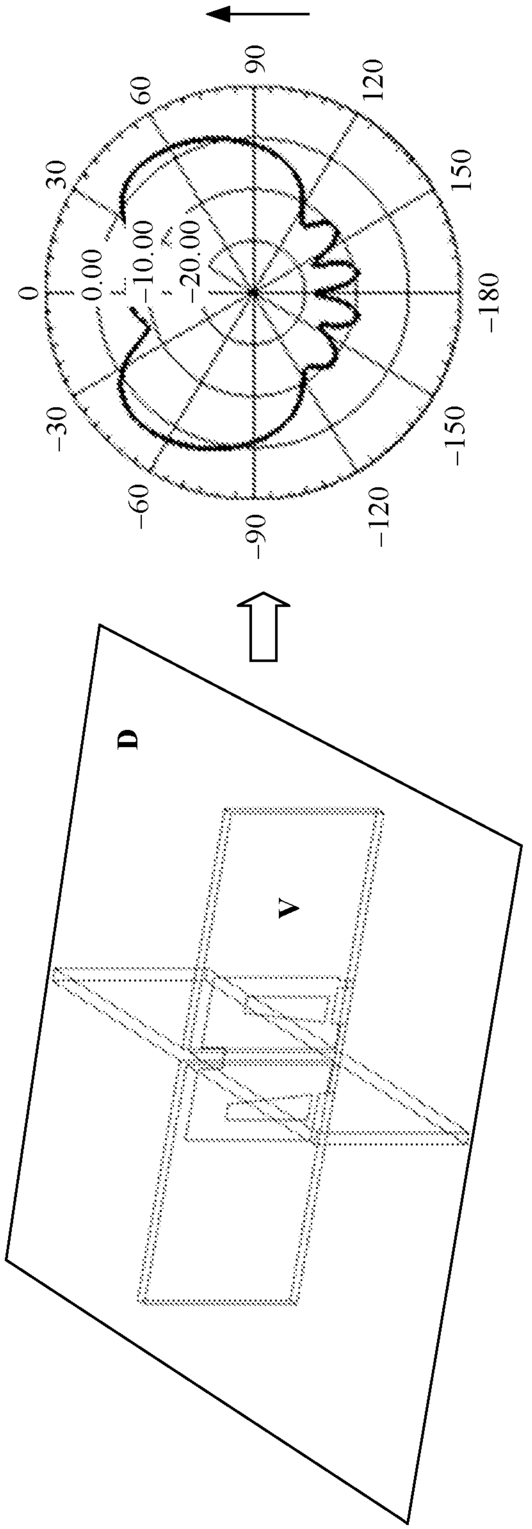
FIG. 7 shows an antenna in a related technology and a simulated radiation pattern obtained through simulation.
Figure 8:
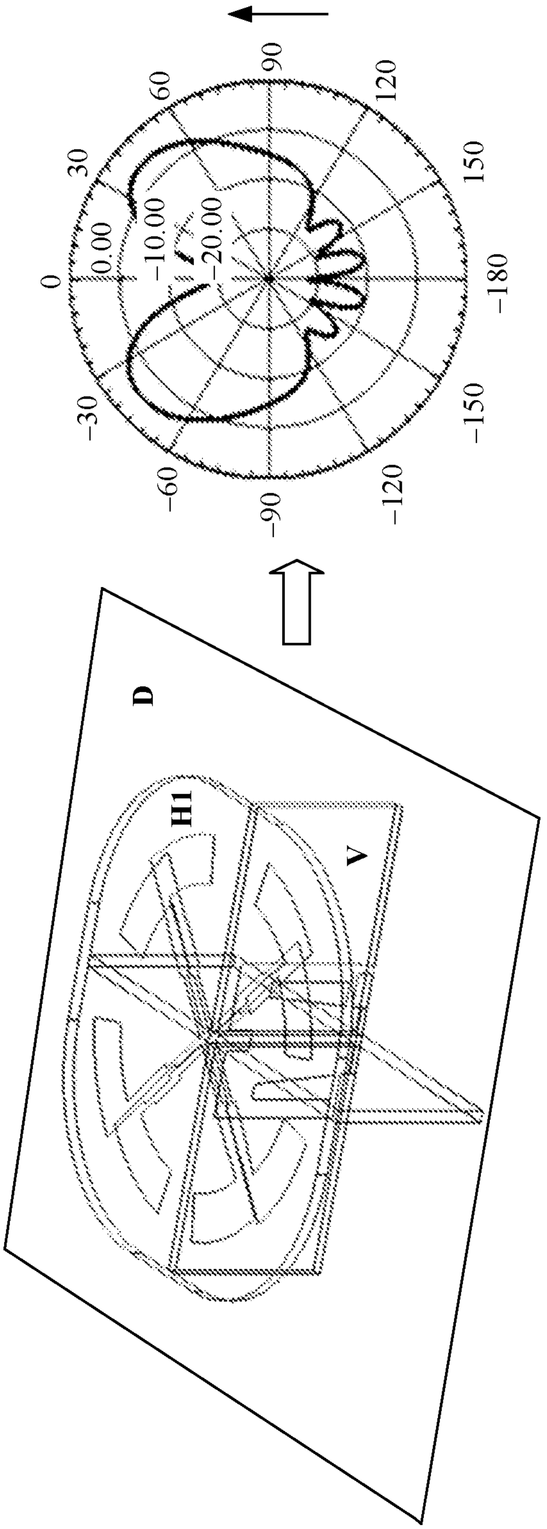
FIG. 8 shows another antenna in a related technology and a radiation field pattern obtained through simulation.
Figure 9:
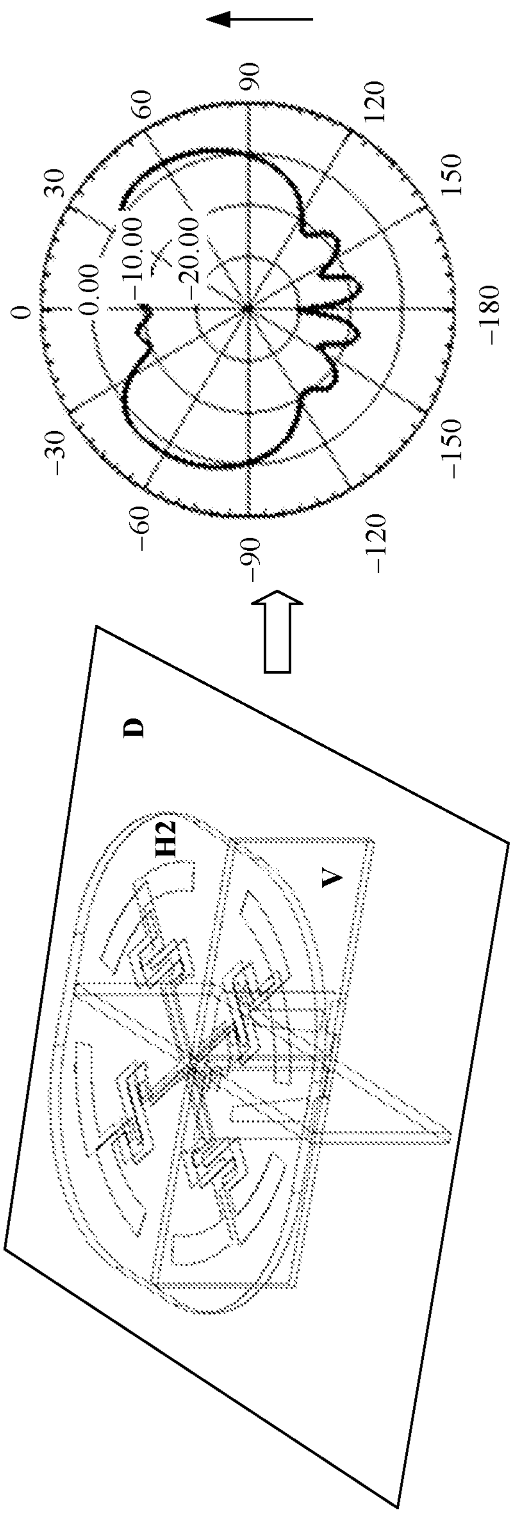
FIG. 9 shows an antenna and a radiation field pattern obtained through simulation according to an embodiment of this application.

In the embodiments of this application, simulation is further separately performed on a vertical polarization antenna, a vertical polarization antenna and a conventional horizontal polarization antenna that are disposed in a stacked manner, and the antenna provided in the embodiments of this application. Simulation results are as follows:

FIG. 7 shows an antenna in a related technology and a simulated radiation pattern obtained through simulation. FIG. 8 shows another antenna in a related technology and a radiation field pattern obtained through simulation. FIG. 9 shows an antenna and a radiation field pattern obtained through simulation according to an embodiment of this application. In FIG. 7, FIG. 8, and FIG. 9, left diagrams are schematic structural diagrams of antennas, and right diagrams are simulated radiation patterns corresponding to the antennas shown in the left diagrams. The antennas shown in FIG. 7 to FIG. 9 each include a ground plate D. The simulated radiation pattern represents a radiation field of the antenna on a cross section perpendicular to the ground plate D.

An arrow in the figure points to a direction that is perpendicular to the ground plate D and that is away from the ground plate D. Due to a reflection effect of the ground plate D, most of radiant energy of the antenna ranges from −90° to +90°.

As shown in FIG. 7, the antenna includes a vertical polarization antenna V disposed on the ground plate D. A maximum gain direction of the vertical polarization antenna V is 50°.

As shown in FIG. 8, the antenna includes the vertical polarization antenna V and a conventional horizontal polarization antenna H1 that are disposed on the ground plate D in a stacked manner. Affected by coupling of the conventional horizontal polarization antenna H1, a maximum gain radiation angle of the vertical polarization antenna V shrinks to 0°, and a maximum gain direction is 43°. It can be learned through comparison of FIG. 7 and FIG. 8 that the conventional horizontal polarization antenna causes reduction of a gain of the vertical polarization antenna that is at a large angle (for example, 75°). Consequently, a coverage distance of the vertical polarization antenna reduces.

As shown in FIG. 9, the antenna includes the vertical polarization antenna V and a horizontal polarization antenna H2 that are disposed on the ground plate D in a stacked manner.

The horizontal polarization antenna H2 may be the horizontal polarization antenna 01 shown in FIG. 2. A phase of a coupling radiation field of the horizontal polarization antenna is adjusted by bending a double-sided parallel strip line of the horizontal polarization antenna H2, so that a maximum gain radiation angle of the vertical polarization antenna changes to a large angle. A maximum gain direction of the vertical polarization antenna is 54°, which exceeds the maximum gain direction 43° in FIG. 8 and also exceeds the maximum gain direction 50° in FIG. 7. That is, after the horizontal polarization antenna H2 is stacked, the vertical polarization antenna V has a higher gain and a longer coverage distance at a large angle.

Radiation fields in FIG. 8 and FIG. 9 are radiation fields of the vertical polarization antenna V, and the radiation fields are obtained through simulation when the horizontal polarization antenna does not work. An operating frequency of the vertical polarization antenna V is 5.5 GHz, a dielectric constant of a material inside double-sided parallel strip lines of the horizontal polarization antenna H1 and the horizontal polarization antenna H2 is 4.6, and a thickness of the material is 1 millimeter. A length of the double-sided parallel strip line in the horizontal polarization antenna H1 in FIG. 8 is 14.6 millimeters (that is, at the operating frequency of 5.5 GHz, the length of the double-sided parallel strip line is 0.48 times a waveguide wavelength of an electromagnetic wave in the double-sided parallel strip line). A length of the double-sided parallel strip line in the horizontal polarization antenna H2 in FIG. 9 is 27.72 millimeters (that is, 0.91 times a waveguide wavelength of an electromagnetic wave in the double-sided parallel strip line at the operating frequency of 5.5 GHz).

It can be learned through comparison of FIG. 7 and FIG. 8 that in FIG. 8, after the conventional horizontal polarization antenna H1 is stacked on the vertical polarization antenna V, a radiation field pattern of the vertical polarization antenna V shrinks, that is, a signal coverage area of the vertical polarization antenna V becomes smaller. It can be learned through comparison of FIG. 7 and FIG. 9 that in FIG. 9, after the horizontal polarization antenna H2 provided in the embodiments of this application is stacked on the vertical polarization antenna V, the radiation field pattern of the vertical polarization antenna V expands, that is, the signal coverage area of the vertical polarization antenna V becomes larger. Therefore, the antenna provided in this embodiment of this application improves a far-region radiation capability of the vertical polarization antenna.

Figure 10:
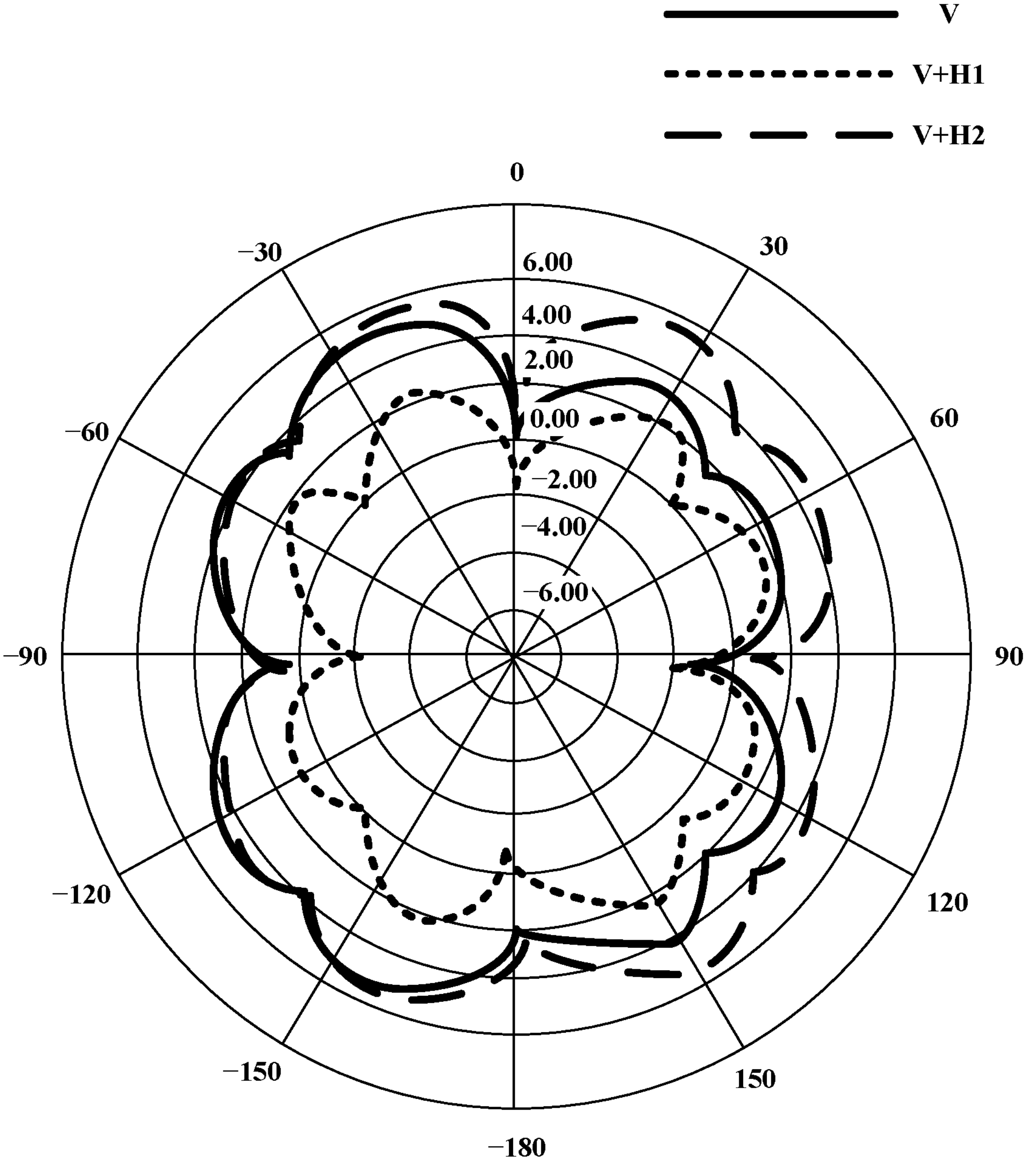
FIG. 10 is a schematic diagram of field distribution of a 75° tangent plane of radiation field patterns in FIG. 7, FIG. 8, and FIG. 9.

For example, FIG. 10 is a schematic diagram of field distribution of a 75° tangent plane of radiation field patterns of the vertical polarization antenna V in FIG. 7, the vertical polarization antenna V in the antenna V+H1 in FIG. 8, and the vertical polarization antenna V in the antenna V+H2 in FIG. 9. The 75° tangent plane is a 75° pitch plane of the antenna. Table 1 lists average gains (unit: decibel (dB)) of the three antennas on the 75° pitch plane.

TABLE 1

| Operating frequency | V→Average gain | V + H1→Average gain | V + H2→Average gain |
|---|---|---|---|
| 5.15 GHz | 2.1 dB | 0.9 dB | 2.7 dB |
| 5.5 GHz | 2.3 dB | 0.4 dB | 2.8 dB |
| 5.85 GHz | 2.3 dB | −3.3 dB | 2.9 dB |

Referring to Table 1, the average gain of the vertical polarization antenna V in FIG. 8 on the 75° pitch plane is less than the average gain of the vertical polarization antenna V in FIG. 7 on the 75° pitch plane. The average gain of the vertical polarization antenna V in FIG. 9 on the 75° pitch plane is greater than the average gain of the vertical polarization antenna V in FIG. 7 on the 75° pitch plane. It can be learned from Table 1 and FIG. 10 that the antenna provided in the embodiments of this application can increase a gain of the vertical polarization antenna on a large-angle pitch plane.

In conclusion, the embodiments of this application provide the antenna. The antenna includes the horizontal polarization antenna and the vertical polarization antenna that are disposed in the stacked manner. A length of a double-sided parallel strip line is 0.58 to 1.35 times a waveguide wavelength of an electromagnetic wave in the double-sided parallel strip line at the operating frequency of the vertical polarization antenna. When the vertical polarization antenna works, distribution of a total radiation field of the vertical polarization antenna is affected by a coupling radiation field of the horizontal polarization antenna. A total phase delay of the double-sided parallel strip line is changed by adjusting the length of the double-sided parallel strip line, to adjust a phase of the coupling radiation field of the horizontal polarization antenna. To be specific, the total radiation field of the vertical polarization antenna is changed, to achieve a purpose of adjusting a radiation angle of the vertical polarization antenna to enhance a large-angle radiation capability of the vertical polarization antenna. According to the solutions provided in this application, deterioration of radiation performance of the vertical polarization antenna caused by a blocking problem is alleviated without increasing an overall height of the antenna. This increases a gain of the vertical polarization antenna on the large-angle pitch plane, and enhances a far-region radiation capability of the vertical polarization antenna. In this way, a compact design of a product can be realized without increasing a thickness of the communications device. In addition, a far-region radiation capability of an antenna is improved, so that a signal coverage area of the communications device can be expanded. In this way, deployment density of the communications device, a quantity of deployed communications devices, and costs can be reduced.

Figure 11:
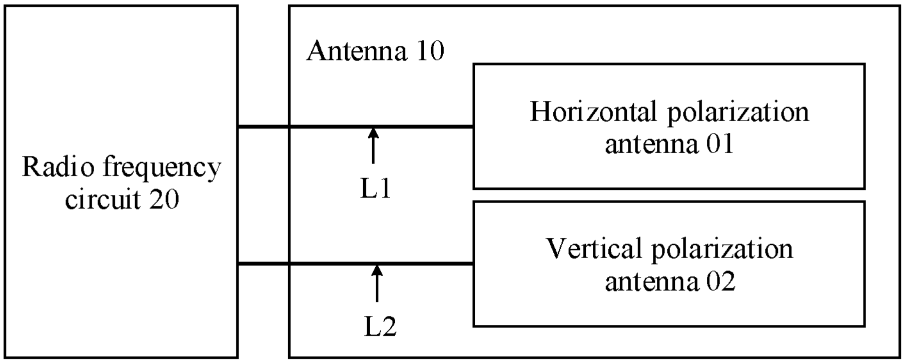
FIG. 11 is a schematic structural diagram of a communications device according to an embodiment of this application.

FIG. 11 is a schematic structural diagram of a communications device according to an embodiment of this application. As shown in FIG. 11, the communications device includes an antenna 10 and a radio frequency circuit 20. The antenna 10 may be the antenna shown in FIG. 1.

The antenna 10 includes the vertical polarization antenna 02 and the horizontal polarization antenna 01 shown in any one of FIG. 2 to FIG. 4, and FIG. 6. The antenna 10 is connected to the radio frequency circuit 20.

Optionally, the antenna 10 is connected to the radio frequency circuit 20 through a coaxial cable. Referring to FIG. 11, the radio frequency circuit 20 is connected to the horizontal polarization antenna 01 through the coaxial cable L1. For example, one end of the coaxial cable L1 is connected to a feedpoint 014 of the horizontal polarization antenna 01, and the other end of the coaxial cable L1 is curved to a surface of a ground plate 03. The other end of the coaxial cable L1 extends along the surface of the ground plate 03 and is connected to the radio frequency circuit 20.

In this embodiment of this application, the vertical polarization antenna 02 is also connected to the radio frequency circuit 20. For example, referring to FIG. 11, the radio frequency circuit 20 is connected to the vertical polarization antenna 02 through a coaxial cable L2. Alternatively, the antenna 10 may further include a transmission line printed on the ground plate 03, and the vertical polarization antenna 02 is connected to the radio frequency circuit 20 through the transmission line.

Optionally, the communications device is an AP or a base station.

In conclusion, an embodiment of this application provides a communications device, and the communications device includes an antenna. According to the solutions provided in the embodiments of this application, deterioration of radiation performance of the vertical polarization antenna caused by a blocking problem can be alleviated without increasing an overall height of the antenna. Therefore, a compact design of a product can be realized without increasing a thickness of the communications device. In addition, in the antenna provided in the embodiments of this application, a gain of the vertical polarization antenna on a large-angle pitch plane is increased, and a far-region radiation capability of the vertical polarization antenna is enhanced. Therefore, signal strength of the communications device can be increased, and a signal coverage area of the communications device can be expanded. In this way, deployment density of the communications device, a quantity of deployed communications devices, and costs can be reduced.

In the embodiments of this application, the terms “first”, “second”, and “third” are merely used for a purpose of description, and shall not be understood as an indication or implication of relative importance.

The term “and/or” in this application describes only an association relationship for describing associated objects and represents that three relationships may exist. For example, A and/or B may represent the following three cases: Only A exists, both A and B exist, and only B exists. In addition, the character “/” in this specification generally indicates an “or” relationship between the associated objects.

The foregoing descriptions are merely optional embodiments of this application, but are not intended to limit this application. Any modification, equivalent replacement, or improvement made without departing from the concept and principle of this application should fall within the protection scope of this application.

What is claimed is:

1. An antenna comprising: a horizontal polarization antenna comprising a plurality of radiation elements and a plurality of double-sided parallel strip lines, each double-sided parallel strip line having one end connected to a corresponding radiation element and a second end connected to a feed point at a center of the horizontal polarization antenna, the radiation elements being dip olar and being disposed axisymmetrically with respect to the feed point; and a vertical polarization antenna disposed in a stacked manner with respect to the horizontal polarization antenna, wherein the double-sided parallel strip lines of the horizontal polarization antenna have a non-linear shape, and a length range of each double-sided parallel strip line antenna is 0.58 to 1.35 times a waveguide wavelength of an electromagnetic wave in said each double-sided parallel strip line at an operating frequency of the vertical polarization antenna.

2. The antenna according to claim 1, wherein a linear distance between a radiation element at one end of a double-sided parallel strip line and the feed point at a second end of the double-sided parallel strip line is 0.36 to 0.57 times the waveguide wavelength.

3. The antenna according to claim 1, wherein the nonlinear shape of the double-sided parallel strip lines comprises a bent line structure and/or a curved line structure.

4. The antenna according to claim 1, wherein an operating frequency band of the vertical polarization antenna is identical to an operating frequency band of the horizontal polarization antenna.

5. The antenna according to claim 1, wherein each double-sided parallel strip line has multiple bent segments with different line widths.

6. The antenna according to claim 1, wherein the vertical polarization antenna is a monopole antenna.

7. The antenna according to claim 1, wherein the antenna further comprises a ground plate, the vertical polarization antenna is disposed on the ground plate, and the horizontal polarization antenna is disposed over the vertical polarization antenna and away from the ground plate.

8. A communications device comprising: a radio frequency circuit; and an antenna connected to the radio frequency circuit, the antenna comprising: a horizontal polarization antenna comprising a plurality of radiation elements and a plurality of double-sided parallel strip lines, each double-sided parallel strip line having one end connected to a corresponding radiation element and a second end connected to a feed point at a center of the horizontal polarization antenna, the radiation elements being dip olar and being disposed axisymmetrically with respect to the feed point; and a vertical polarization antenna disposed in a stacked manner with respect to the horizontal polarization antenna, wherein the double-sided parallel strip lines of the horizontal polarization antenna have a non-linear shape, and a length range of the each double-sided parallel strip line antenna is 0.58 to 1.35 times a waveguide wavelength of an electromagnetic wave in the said each double-sided parallel strip line at an operating frequency of the vertical polarization antenna.

9. The communications device according to claim 8, wherein a linear distance between a radiation element at one end of a double-sided parallel strip line and the feed point at a second end of the double-sided parallel strip line is 0.36 to 0.57 times the waveguide wavelength.

10. The communications device according to claim 8, wherein the non-linear shape of the double-sided parallel strip lines comprises a bent line structure and/or a curved line structure.

11. The communications device according to claim 8, wherein an operating frequency band of the vertical polarization antenna is identical to an operating frequency band of the horizontal polarization antenna.

12. The communications device according to claim 8, wherein each double-sided parallel strip line has multiple bent segments with different line widths.

13. The communications device according to claim 8, wherein the vertical polarization antenna is a monopole antenna.

14. The communications device according to claim 8, wherein the antenna further comprises a ground plate, the vertical polarization antenna is disposed on the ground plate, and the horizontal polarization antenna is disposed over the vertical polarization antenna away from the ground plate.

* * * * *